(12) United States Patent
Hartmann et al.

(10) Patent No.: US 7,661,298 B2
(45) Date of Patent: Feb. 16, 2010

(54) METHOD AND DEVICE FOR OPERATING AN INTERNAL COMBUSTION ENGINE HAVING AT LEAST ONE CYLINDER

(75) Inventors: Dirk Hartmann, Stuttgart (DE); Georg Mallebrein, Korntal-Meunchingen (DE); Werner Mezger, Eberstadt (DE); Andreas Roth, Muehlacker-Lomersheim (DE); Henri Barbier, Schwieberdingen (DE); Nikolas Poertner, Stuttgart (DE); Juergen Rappold, Ilsfeld-Auenstein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 12/074,588

(22) Filed: Mar. 4, 2008

(65) Prior Publication Data
US 2008/0229817 A1  Sep. 25, 2008

(30) Foreign Application Priority Data
Mar. 20, 2007  (DE) .................. 10 2007 013 250

(51) Int. Cl.
*G01M 15/04*  (2006.01)
(52) U.S. Cl. ................. 73/114.79; 73/114.26
(58) Field of Classification Search .......... 73/114.26, 73/114.27, 114.32, 114.77, 114.79
See application file for complete search history.

(56) References Cited

U.S. PATENT DOCUMENTS
6,907,339 B2 *  6/2005  Henn ................ 701/104

FOREIGN PATENT DOCUMENTS
DE  10 2005 047 446  4/2007

* cited by examiner

*Primary Examiner*—Eric S McCall
(74) *Attorney, Agent, or Firm*—Kenyon & Kenyon LLP

(57) ABSTRACT

A method and a device for operating an internal combustion engine including at least one cylinder are described, the at least one cylinder including at least one intake valve and at least one exhaust valve and a diagnosis of at least one erroneous intake valve or at least one erroneous exhaust valve is made possible without using a position acknowledgment. A gas exchange of the at least one cylinder is diagnosed thereby. For detection of at least one intake valve or exhaust valve for the existence of an erroneous valve position, at least one intake valve or exhaust valve of the at least one cylinder different from at least one intake valve or exhaust valve to be detected is brought into a predefined position, which is selected in such a way that the gas exchange of the at least one cylinder in the case of an erroneous valve position of the at least one intake valve or exhaust valve to be detected differs significantly from the gas exchange of the at least one cylinder for the case of an error-free valve position of the at least one intake valve or exhaust valve to be detected, a value characteristic for the gas exchange of the at least one cylinder being ascertained, this value being expected at the moment for an error-free state of the set valve positions of the at least one intake valve and the at least one exhaust valve of the at least one cylinder, the actual value characteristic for the gas exchange of the at least one cylinder being ascertained and an error in the position of the at least one intake valve or exhaust valve to be detected is recognized as a function of the deviation in the actual value from the expected value.

10 Claims, 7 Drawing Sheets

METHOD AND DEVICE FOR OPERATING AN INTERNAL COMBUSTION ENGINE HAVING AT LEAST ONE CYLINDER

RELATED APPLICATION INFORMATION

This application claims the benefit of and priority to German Patent Application No. 10 2007 013 250.8, which was filed in Germany on Mar. 20, 2007, the disclosure of which is hereby incorporated by reference.

FIELD OF THE INVENTION

The present invention is directed to a method and a device for operating an internal combustion engine having at least one cylinder.

BACKGROUND INFORMATION

A method and a device for operating an internal combustion engine having multiple cylinders is discussed in German patent application, which has application number 10 2005 047 446 and which was not published previously, in which the cylinders each include an intake valve and an exhaust valve and a characteristic quantity for a suction performance of a cylinder of the internal combustion engine is ascertained. If the value for the suction performance obtained for the characteristic quantity is compared with a setpoint value, the function of the suction of the cylinder may be diagnosed as a function of the result of the comparison. It is readily possible in this way with the help of the characteristic quantity for the suction performance of the cylinder to check on whether or not the suction of the cylinder is defective. Suction performance is influenced among other things as a function of the phase angle and the lift of the valve lift diagram of the intake valve(s) of the particular cylinder and the imperviousness of the combustion chamber of the particular cylinder, in particular with regard to the intake and exhaust valves and the piston rings.

SUMMARY OF THE INVENTION

The method and device according to the present invention for operating an internal combustion engine having at least one cylinder having the features of the independent claims have the advantage over the related art in that a gas exchange of the at least one cylinder is diagnosed; that for detecting the existence of an erroneous valve position of at least one intake valve or exhaust valve, at least one intake valve or exhaust valve of the at least one cylinder different from at least one intake valve or exhaust valve to be detected is brought into a predefined position, which is selected in such a way that the gas exchange of the at least one cylinder in the case of an erroneous valve position of the at least one intake valve or exhaust valve to be detected differs significantly from the gas exchange of the at least one cylinder in the case of an error-free valve position of the at least one intake valve or exhaust valve to be detected; that a value characteristic for the gas exchange of the at least one cylinder is ascertained, this value being instantaneously expected for an error-free state of the set valve positions of the at least one intake valve and the at least one exhaust valve of the at least one cylinder; that the actual value characteristic for the gas exchange of the at least one cylinder is ascertained, and an error in the position of the at least one intake valve or exhaust valve to be detected is recognized as a function of a deviation of the actual value from the expected value. In this way, an erroneous valve position of at least one intake valve or exhaust valve of the at least one cylinder may be ascertained without any acknowledgment of position and thus without additional sensors and therefore in a less complex and less expensive manner.

Due to the measures characterized in the subclaims, advantageous refinements of and improvements on the method characterized in the main claim are possible.

It is advantageous in particular if the error in the position of the at least one intake valve or exhaust valve to be detected is recognized when the deviation ascertained is significant. This increases the reliability of error detection.

Another advantage is obtained when the characteristic value for the gas exchange is ascertained by analyzing a pressure curve in an intake manifold of the internal combustion engine and/or a suction performance of the at least one cylinder of the internal combustion engine. In this way, the error detection of the valve positions of the at least one cylinder may be implemented by using quantities that have been ascertained anyway, so that the error diagnosis of the valve positions may be implemented with the least possible additional effort.

It is advantageously provided that for detection of an erroneously opened or erroneously opening intake valve of a shutdown cylinder whose total intake valves and exhaust valves are expected to be in a closed valve position, at least one exhaust valve is to be opened for diagnosis of the gas exchange of the at least one cylinder, the characteristic value for the gas exchange of the at least one cylinder is to be ascertained when at least one exhaust valve is opened and an erroneously opened or erroneously opening intake valve is to be detected when the ascertained characteristic value for the gas exchange of the at least one cylinder indicates the presence of a gas exchange. In this way, an erroneously opened or erroneously opening intake valve of a shutdown cylinder may be detected with great reliability and little computation effort.

The same advantage is derived when, for detection of an erroneously opened or erroneously opening exhaust valve of a shutdown cylinder, all of whose intake valves and exhaust valves are expected to be in the closed position, at least one intake valve is opened for diagnosis of the gas exchange of the at least one cylinder when the characteristic value for the gas exchange of the at least one cylinder is ascertained with the at least one intake valve opened, and when an erroneously opened or erroneously opening exhaust valve is detected, when the ascertained characteristic value for the gas exchange of the at least one cylinder indicates the presence of a gas exchange.

It is also advantageous if, for detection of an erroneously closed or erroneously closing exhaust valve of an activated cylinder for which a gas exchange greater than zero, in particular greater by a tolerance range, is expected, all of the exhaust valves different from the erroneously closed or erroneously closing exhaust valve to be detected of the at least one cylinder are closed for a diagnosis of the gas exchange of the at least one cylinder when for this case the characteristic value for the gas exchange of the at least one cylinder is ascertained and when an erroneously closed or erroneously closing exhaust valve is detected, when the characteristic value ascertained for the gas exchange of the at least one cylinder does not indicate the presence of a gas exchange. In this way, in the case of the activated cylinder, it is possible to detect in an extremely simple and reliable manner requiring little computation effort not only that one exhaust valve has been erroneously closed or is erroneously closing but that this erroneously closed or erroneously closing exhaust valve may also be identified unambiguously.

A corresponding advantage for the detection of an erroneously closed or erroneously closing intake valve of an activated cylinder for which a gas exchange greater than zero, in particular greater by a tolerance range, is expected, is obtained when, for a diagnosis of the gas exchange of the at least one cylinder, all the intake valves that are different from the erroneously closed or erroneously closing intake valve to be detected of the at least one cylinder are closed when for this case the characteristic value for the gas exchange of the at least one cylinder is ascertained and when an erroneously closed or erroneously closing intake valve is detected when the ascertained characteristic value for the gas exchange of the at least one cylinder does not indicate the presence of a gas exchange.

Another advantage is obtained when the detection of an erroneous intake valve or exhaust valve is performed during an operating state of overrun fuel cutoff by activating or deactivating the at least one cylinder, depending on the desired diagnosis. In this way, the diagnosis may be performed during ongoing operation of the internal combustion engine without any negative effect on the function of the internal combustion engine.

A corresponding advantage is obtained when an erroneous intake valve or exhaust valve is detected during an operating state of half-engine operation in which half of the cylinders of the internal combustion engine are shut down in a manner that is not noticeable to the driver, i.e., in a torque-neutral manner, while the other half of the cylinders of the internal combustion engine are activated in a manner that is not noticeable for the driver, i.e., in a torque-neutral manner. Therefore, this also does not result in any impairment in the function of the internal combustion engine at least for diagnosis of intake and exhaust valves of a shutdown cylinder in half-engine operation, even if the diagnosis is performed with the internal combustion engine running in half-engine operation.

An exemplary embodiment of the present invention is depicted in the drawings and explained in greater detail in the following description.

DETAILED DESCRIPTION

Figure 1:
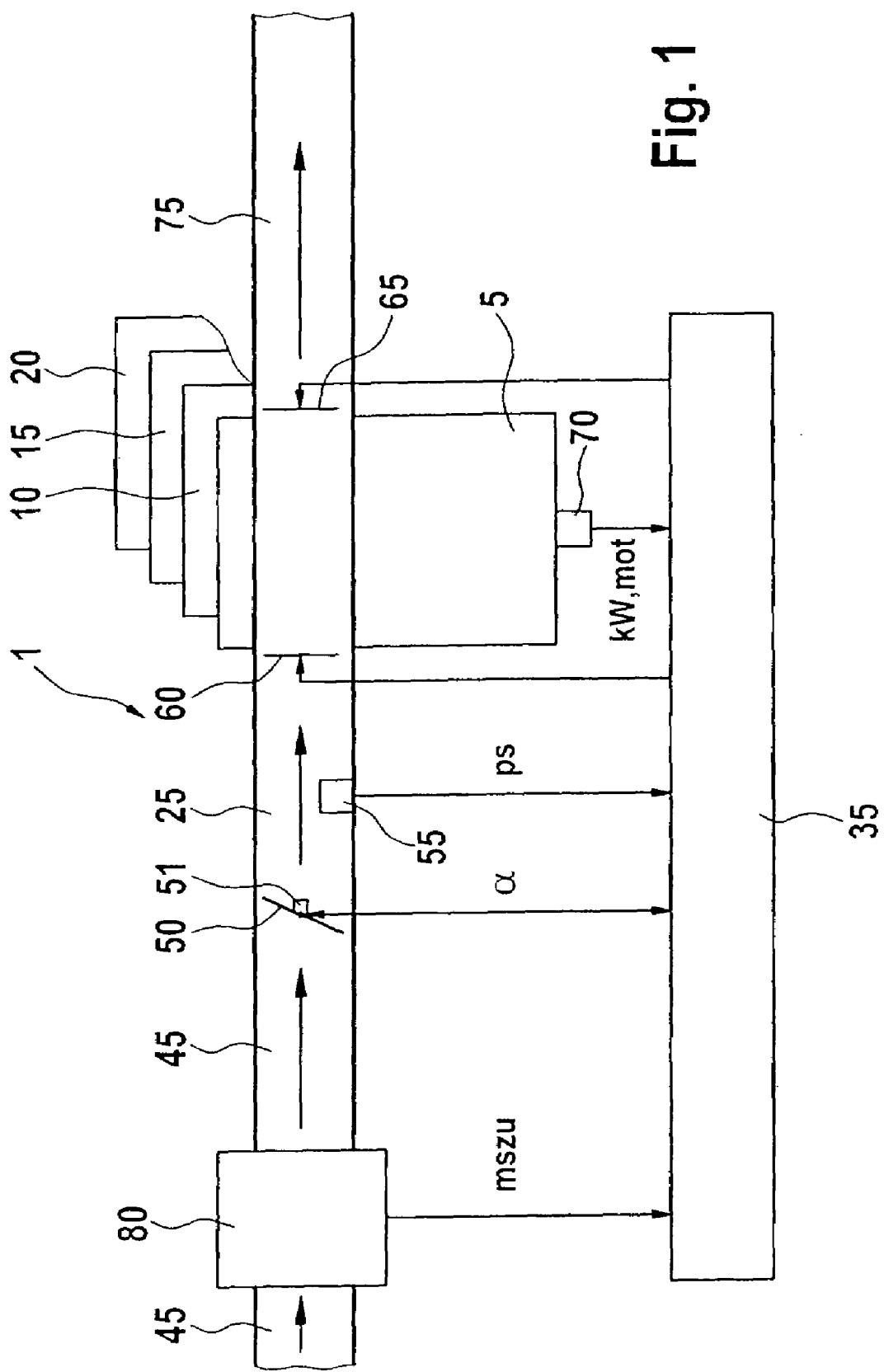
FIG. 1 shows a block diagram of an internal combustion engine.

FIG. 1 shows an internal combustion engine 1, designed as a gasoline engine, for example. Internal combustion engine 1 drives a motor vehicle, for example. In the example according to FIG. 1, it includes four cylinders 5, 10, 15, 20, a first cylinder 5 of which is shown as an example. Air is supplied to first cylinder 5 via an air supply 45, which develops into an intake manifold 25 downstream from a throttle valve 50 in air supply 45 and via an intake valve 60. Furthermore, fuel is injected into intake manifold 25 or directly into cylinder 5 in a manner not shown here. The air/fuel mixture in cylinder 5 is ignited via a spark plug (also not shown in FIG. 1). A piston of first cylinder 5 (not shown in FIG. 1), which in turn drives a crankshaft of internal combustion engine 1, is driven by the subsequent combustion process. The exhaust gas formed by combustion of the air/fuel mixture is expelled via an exhaust valve 65 of first cylinder 5 into an exhaust tract 75 of internal combustion engine 1. The opening and closing points in time of intake valve 60 and exhaust valve 65 are controlled either via a common camshaft or a separate intake camshaft and a separate exhaust camshaft or are controlled directly by an engine controller 35 via a variable valve control, as shown in FIG. 1.

A crank angle sensor 70 situated in the area of cylinders 5, 10, 15, 20 ascertains the instantaneous crank angle of internal combustion engine 1 and relays this information to engine controller 35. An intake manifold pressure sensor 55, which measures the instantaneous value of the intake manifold pressure and relays this information to engine controller 35, is situated in intake manifold 25 downstream from throttle valve 50. The position of throttle valve 50 is controlled by engine controller 35, e.g., as a function of a driver's intent or an external control system, e.g., a traction control, an antilock brake system, a cruise control, a vehicle dynamics control system or the like, returning a position acknowledgment regarding the instantaneous position of throttle valve 50, e.g., with the help of a potentiometer, to engine controller 35. An air mass flow meter 80, e.g., in the form of a hot film air mass flow meter which measures air mass flow rate mszu flowing to intake manifold 25 and relays the measured value to engine controller 35, is situated in air supply 45.

The position value returned by throttle valve 50 is in the form of throttle valve angle $\alpha$, for example. The intake manifold pressure ascertained by intake manifold pressure sensor 55 is labeled as ps in FIG. 1. The crank angle value supplied by crank angle sensor 70 is labeled as KW in FIG. 1, while engine speed nmot derived therefrom by differentiation is also shown. Additional cylinders 10, 15, 20 function in the manner described for first cylinder 5.

The method and device described below allow a characteristic quantity for the suction performance of individual cylinders 5, 10, 15, 20 that are connected to shared intake manifold 25 to be ascertained. The term "suction performance" as used here is understood to refer to a quantity that is typical of the gas exchange and is characteristic of the fresh gas or air flow exhausted in the intake cycle of a particular cylinder 5, 10, 15, 20. The suction performance is influenced here by the following quantities:

the lift volume of the particular cylinder 5, 10, 15, 20, the temperature of the gas flowing into the particular cylinder 5, 10, 15, 20, the phase angle and lift of the valve lift diagram of the intake valve(s) of the particular cylinder 5, 10, 15, 20, and the imperviousness of the combustion chamber of the particular cylinder 5, 10, 15, 20, in particular with regard to the intake and exhaust valves and the piston rings.

The residual gas mass in the particular cylinder 5, 10, 15, 20, characterized by partial pressure pbrint of the residual gas, for example, influences the suction performance. However, to detect only one factor and not another offset for each cylinder 5, 10, 15, 20, in this example the residual gas mass and thus partial pressure pbrint of the residual gas are fixedly predefined.

For internal combustion engines having more than one cylinder, it is of interest in particular to ascertain a different suction performance for each individual cylinder. This is also needed for diagnosis of valve control systems, among other things, which switch the lift of intake valves or even shut down entire cylinders. If internal combustion engine 1 has a suitable steady control mechanism for a cylinder-individual influence on the suction performance, in particular for cylinder-individual controlling of the intake and exhaust valves of each individual cylinder, then a cylinder-individual filling regulation may also be implemented with the help of ascertaining the characteristic quantity for the suction performance of the particular cylinder 5, 10, 15, 20.

To do so, according to the exemplary embodiments and/or exemplary methods of the present invention the characteristic quantity for the suction performance of the particular cylinder 5, 10, 15, 20 is ascertained as a function of the gas mass flow rate in intake manifold 25 and the course of the intake manifold pressure in shared intake manifold 25. In doing so, it should be possible to assign individual cylinders 5, 10, 15, 20 to the characteristic values ascertained for the suction performance.

According to the exemplary embodiments and/or exemplary methods of the present invention, an intake manifold model and a gas exchange model are used for determining the characteristic value for the suction performance and in particular the cylinder-individual differences therein, using the existing filling sensors that have been described, namely air mass flow meter 80 and intake manifold pressure sensor 55. For the method and the device according to the present invention, use of intake manifold pressure sensor 55 is presupposed. Air mass flow meter 80 is advantageously provided for diagnosis of the valve control system in the area of the intake manifold pressure at the approximate level of the ambient pressure but it is not obligatory. As an alternative to main load signal mszu of air mass flow meter 80 in the form of the air mass flow rate flowing to intake manifold 25, signal α of the throttle valve angle sensor designed as a potentiometer in this example may also be utilized as a secondary load signal, this sensor being shown with reference numeral 51 in FIG. 1.

Air mass flow rate mszu supplied to intake manifold 25 is calculated in a manner known to those skilled in the art from throttle valve angle α and additional operating characteristics of internal combustion engine 1, such as temperature T upstream from throttle valve 50 and the pressure ratio across throttle valve 50. The pressure ratio across throttle valve 50 is obtained as ps/pu, where pu is the ambient pressure. Corresponding operating variables T, pu may either be detected by suitable sensors (not shown in FIG. 1) or modeled from other operating characteristics of internal combustion engine 1 in a manner known to those skilled in the art.

For example, an intake air temperature sensor may be provided in air supply 45 upstream from throttle valve 50 to ascertain the gas temperature upstream from throttle valve 50. In addition, an ambient pressure sensor, for example, may also be provided upstream from throttle valve 50 to ascertain the ambient pressure in air supply 45.

The measured intake air temperature is supplied to engine controller 35. The measured ambient pressure is also supplied to engine controller 35. In a manner known to those skilled in the art, engine controller 35 then ascertains, as described here, air mass flow rate or gas mass flow rate mszu supplied to intake manifold 25 from throttle valve angle α, pressure ratio ps/pu across throttle valve 50, and gas temperature T upstream from throttle valve 50.

The intake manifold pressure is sampled by intake manifold pressure sensor 55 with a first predefined sampling rate in a first time interval or crank angle interval, the length and position of which are predefined. Next the sampled intake manifold pressure values are transformed into an engine speed-synchronous computation grid. The transformation takes place by averaging the sampled intake manifold pressure values over the time interval or crank angle interval, the relative position and length of which are predefined. The averaging may be performed by adding up the sampled intake manifold pressure values in a grid that is predefined over time, e.g., 1 ms, and by dividing the resulting sum by the number of grids per first predefined time interval or crank angle interval.

The relationship between the time interval and the particular crank angle interval is established in a manner known to those skilled in the art via instantaneous engine speed nmot. The averaging is done alternatively by adding up only individual random samples at any point in the first predefined time interval or crank angle interval and by dividing the resulting sum by the number of random samples taken. Random samples may be taken at such points in the first predefined time interval or crank angle interval that are considered to be particularly representative of the curve of the intake manifold pressure over time in the first predefined time interval or crank angle interval. To take into account a different significance of individual random samples in averaging, they may also be weighted when they are entered into the average to be formed for the intake manifold pressure in the assigned first predefined time interval or crank angle interval.

In a corresponding manner, air mass flow rate mszu flowing into intake manifold 25 may be ascertained by air mass flow meter 80 by sampling at a second predefined sampling rate in a second time interval or crank angle interval, the length and position of which are predefined. The second predefined sampling rate may advantageously also be selected correspondingly to the first predefined sampling rate. However, the first predefined sampling rate may also be selected differently from the second predefined sampling rate. Alternatively, the air mass flow rate flowing into intake manifold 25 is also modeled and/or calculated from the performance characteristics of throttle valve angle α, temperature T upstream from throttle valve 50, and pressure ratio ps/pu across throttle valve 50 in the manner described here, this calculation being performed in a predefined computation grid, e.g., in grids of 1 ms in the second time interval or crank angle interval, the length and position of which are predefined.

Regardless of how air mass flow rate mszu flowing into intake manifold 25 is determined from the main load signal or the secondary load signal, the transformation of the sample or computation values for air mass flow rate mszu flowing into intake manifold 25 is transformed into an engine speed-synchronous computation grid as described here by the fact that the samples or computation values for air mass flow rate mszu are averaged over the second predefined time interval or crank angle interval. This averaging is again performed by adding up the measured values in the computation grid described here, e.g., 1 ms, and by dividing the resulting sum by the number of computation grids per second predefined time interval or crank angle interval. Alternatively, individual random samples may again be ascertained for air mass flow rate mszu flowing into intake manifold 25 at any points in the second predefined time interval or crank angle interval and added up and divided by the number of random samples to form an average.

In doing so, the random samples may advantageously be formed in particular at points in the second predefined time interval or crank angle interval that are of greater importance for the course of air mass flow rate mszu in the second predefined time interval or crank angle interval; depending on the importance of the selected points for taking random samples, these may also be entered into the average with different weighting.

In a four-cycle engine, a value that may be described with the following equation is used as a reference value for the length of the first or second predefined crank angle interval:

$$Phi\_length = 720° \, KW / \text{cylinder number} \qquad (1)$$

where Phi_length corresponds to the length of the first or second predefined crank angle interval, KW denotes the crank angle and the cylinder number refers to the number of cylinders in internal combustion engine 1; in the present example, cylinder number=4.

However, longer or shorter first or second predefined crank angle intervals may also be selected.

According to equation (1) the first or second predefined crank angle interval becomes smaller with an increase in cylinder number. It is important that the first and the second predefined crank angle intervals may be assigned to the suction phase of the cylinder being considered for ascertaining the characteristic value for the suction performance.

Figure 2:
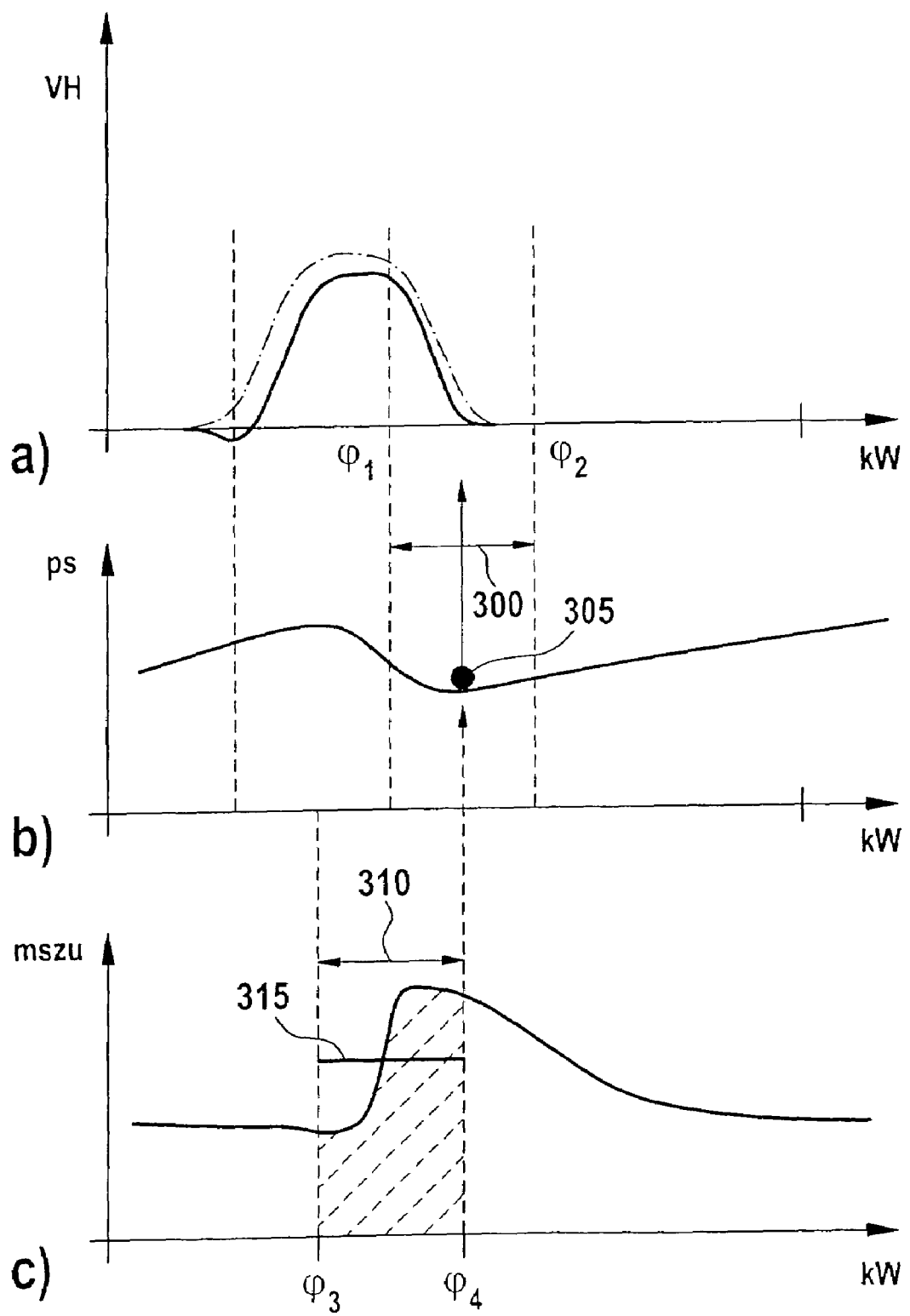
FIG. 2a shows a diagram of valve lift as a function of crank angle.
FIG. 2b shows a diagram of intake manifold pressure as a function of crank angle.
FIG. 2c shows a diagram of mass flow into the intake manifold as a function of crank angle.

For the detection of the intake manifold pressure, the phase angle of the first predefined crank angle interval may be adjusted as a function of the installed position of intake manifold pressure sensor 55 in intake manifold 25 and in particular as a function of engine speed nmot and other parameters such as the average of intake manifold pressure ps. For averaging intake manifold pressure ps, it has proven to be a more favorable value if the first predefined crank angle interval is situated approximately centrally around the "intake closes" point in time of the corresponding cylinder. This circumstance is depicted in FIGS. 2a) and 2b). FIG. 2a) shows the curve of valve lift VH of the intake valve of one of cylinders 5, 10, 15, 20 of internal combustion engine 1 as a function of crank angle KW. The valve lift curve is shown with a dash-dot line; the curve of the air mass flow rate to the corresponding cylinder is shown with a superimposed solid line for comparison.

The middle of first predefined crank angle interval 300 is placed approximately at crank angle KW, at which valve lift VH and with it the air mass flow rate to the corresponding cylinder reach a value of zero again starting from its maximum value. This crank angle interval begins at a first crank angle $\phi 1$ before "intake closes" and ends at a second crank angle $\phi 2$ after "intake closes." According to the curve of intake manifold pressure ps as a function of crank angle KW according to FIG. 2b), the value of intake manifold pressure ps at the middle of the first predefined crank angle interval corresponds approximately to the average of the curve of intake manifold pressure ps as a function of crank angle KW in the first predefined crank angle interval.

The average of intake manifold pressure ps in first predefined crank angle interval 300 is labeled with reference numeral 305 in FIG. 2b).

For the detection of the air mass flow rate, the second predefined crank angle interval for averaging air mass flow rate mszu may deviate in length and phase from the first predefined crank angle interval for averaging intake manifold pressure ps. Averaging of air mass flow rate mszu should ideally be performed in a second predefined crank angle interval, which is offset with respect to the first predefined crank angle interval by a predefined crank angle because the suction of gas from intake manifold 25 is detected in the first predefined crank angle interval. The second predefined crank angle interval is advantageously shifted toward "early" in relation to the first predefined crank angle interval, which may be by half an ignition interval between two cylinders fired in immediate succession. The first predefined crank angle interval and the second predefined crank angle interval may also overlap with one another or alternatively may not have any overlap in common.

Such a phase shift in the predefined crank angle intervals for averaging over intake manifold pressure ps and air mass flow rate mszu takes into account the fact that air mass flow rate mszu into intake manifold 25 during the second predefined crank angle interval yields the intake manifold pressure ascertained and in particular averaged in the first predefined crank angle interval as the final value. The signals from intake manifold pressure ps and air mass flow rate mszu thus averaged over the corresponding crank angle intervals in the intake phase of the corresponding cylinder are to be assigned clearly to this cylinder.

FIG. 2c) shows air mass flow rate mszu flowing into the intake manifold as a function of crank angle KW. Second predefined crank angle interval 310 here has been shifted toward "early" by half the ignition interval described above with respect to first predefined crank angle interval 300 from a third crank angle $\phi 3$ to a fourth crank angle $\phi 4$ and overlaps with first predefined crank angle interval 300. Second predefined crank angle interval 310 thus covers the curve of valve lift VH at maximum valve lift at which the greatest suction performance of the particular intaking cylinder occurs, so that in second predefined crank angle interval 310, there is a marked increase in air mass flow rate mszu over crank angle KW and its average over second predefined crank angle 310 is labeled with reference numeral 315.

According to FIG. 2c), second predefined crank angle interval 310 is selected in such a way that fourth crank angle $\phi 4$ is situated approximately in the middle of first predefined crank angle interval 300. In selecting both predefined crank angle intervals 300, 310 it is assumed that only the cylinder assigned to the valve lift curve according to FIG. 2a) is intaking air between third crank angle $\phi 3$ and second crank angle $\phi 2$ but the other cylinders of the internal combustion engine are not intaking.

The differential equation of intake manifold 25 may now be formulated as follows:

$$ps = \frac{\int (mszu - msab) \cdot dt}{\text{volume}_{intake\ manifold} \cdot \text{density}_{gas}} \qquad (2)$$

Equation (2) thus represents the intake manifold model. This integral equation (2) may be implemented in engine controller 35 by a simple computation procedure in a synchronous computation grid. The computation in a synchronous computation grid, i.e., once per intake of a cylinder, entails the calculation being based not on air mass flow rates but instead on fillings; rlab refers to the fresh air filling in the combustion chamber of the cylinder in question, which is obtained during the intake phase of the cylinder when air mass flow rate msab is flowing into the combustion chamber of the cylinder in question. In equation (2) msab is thus the air mass flow rate flowing into the combustion chamber of the cylinder during its intake phase. Volume$_{intake\ manifold}$ is the volume of intake manifold 25 and density$_{gas}$ is the density of the fresh gas in the intake manifold; rlzu is in turn the fresh air filling entering intake manifold 25 during the intake phase of the cylinder in question when air mass flow rate mszu is flowing toward intake manifold 25; rlzu is a standardized filling which assumes values between 0% and 100% and is obtained by the following equation:

$$rlzu = \frac{mszu}{nmot \cdot KUMSRL} \quad (3)$$

In equation (3) KUMSRL is a constant which depends on the number of cylinders and the engine displacement for converting between air mass flow rate and filling and may be applied on a test bench, e.g., in a manner known to those skilled in the art or calculated from the engine displacement and the number of cylinders in the engine.

The integral equation (2) of intake manifold 25 may now be written as a summation equation with fillings in the synchronous computation grid:

$$ps(n)=ps(n-1)+K_{intake} \cdot [rlzu(n)-rlab(n)] \quad (4)$$

Equation (4) means that intake manifold pressure ps(n) ascertained for computation grid n is obtained from intake manifold pressure ps(n−1) ascertained for computation grid n−1 plus the difference between filling rlzu(n) flowing into intake manifold 25 in computation grid n and filling rlab(n) flowing out of intake manifold 25 into the cylinder in question in computation grid n multiplied times a constant K$_{intake}$. Constant K$_{intake}$ depends on the volume of the intake manifold and the temperature in the intake manifold and may be applied on a test bench, for example, or obtained from the geometric quantities of the intake manifold in a manner known to those skilled in the art. Computation grid n−1 occurs earlier than computation grid n by exactly one synchronous computation grid for the cylinder in question; it thus occurs in the intake phase of this cylinder immediately preceding the intake phase of the cylinder in question assigned to computation grid n. Solving equation (4) for rlab(n) yields $$rlab(n)=rlzu(n)+[ps(n-1)-ps(n)]/K_{intake} \quad (5)$$

In equation (5) ps(n−1) and ps(n) denote the measured quantity for the intake manifold pressure averaged over the first predefined crank angle interval, with rlzu being the filling signal obtained from measured or modeled air mass flow rate signal mszu via equation (3), the filling signal representing an average over the second predefined crank angle interval.

The determination of air mass flow rate mszu and thus of filling rlzu may be calculated as described above with the help of the secondary load signal, i.e., from a throttle valve model, in particular at pressure conditions above throttle valve 50 of ps/pu<0.8, the throttle valve position α, intake manifold pressure ps, ambient pressure pu, and temperature T upstream from throttle valve 50 being then taken into account here accordingly in the manner described.

Filling rlab(n) intake into the cylinder in question according to equation (5) represents a first characteristic quantity for the suction performance of the cylinder in question. As a rule, however, quantity rlab thus calculated is still not the desired target quantity. Instead, as a rule, a quantity that represents the suction performance of the cylinder in question regardless of the intake manifold pressure and optionally also regardless of the temperature and the setpoint position of the camshaft should be calculated. Therefore, in addition to the intake manifold model according to equation (2), a gas exchange model is also needed.

The gas exchange model describes fresh air filling rlab intake into the cylinder in question as a function of intake manifold pressure ps. As already described, there are additive components in the gas exchange model. These are summarized by partial pressure pbrint of the residual gas. However, this additive component should not be calculated but instead it should be fixedly predefined. Therefore, a multiplicative quantity, i.e., a factor describing the suction performance of the corresponding cylinder, is the only quantity to be determined for each cylinder 5, 10, 15, 20. The gas exchange equation of the gas exchange model, solved for the factor of the conversion from pressure into filling, is thus $$fupsrl(n)=rlab(n)/[ps(n)-pbrint(n)] \quad (6)$$

The quantities included in equation (6) again represent an average over synchronous computation grid n or the corresponding first or second crank angle interval. Factor fupsrl(n) for the conversion of pressure into filling represents a second characteristic value for the suction performance of the cylinder in question.

To obtain an independence of temperature T of the intake air, factor fupsrl(n) may be used for conversion of pressure into filling itself, again based on an empirical value fupsrlsetpoint(n):

$$fupsrl(n)=fupsrl\text{setpoint}(n) \cdot factor_{fupsrl} \quad (7)$$

Factor factor$_{fupsrl}$ from equation (7) is independent of intake manifold pressure and temperature and is a third characteristic quantity for the suction performance of the cylinder in question. These facts, which are represented in equations (5) through (7), constitute the central idea of the exemplary embodiments and/or exemplary methods of the present invention.

Figure 4:
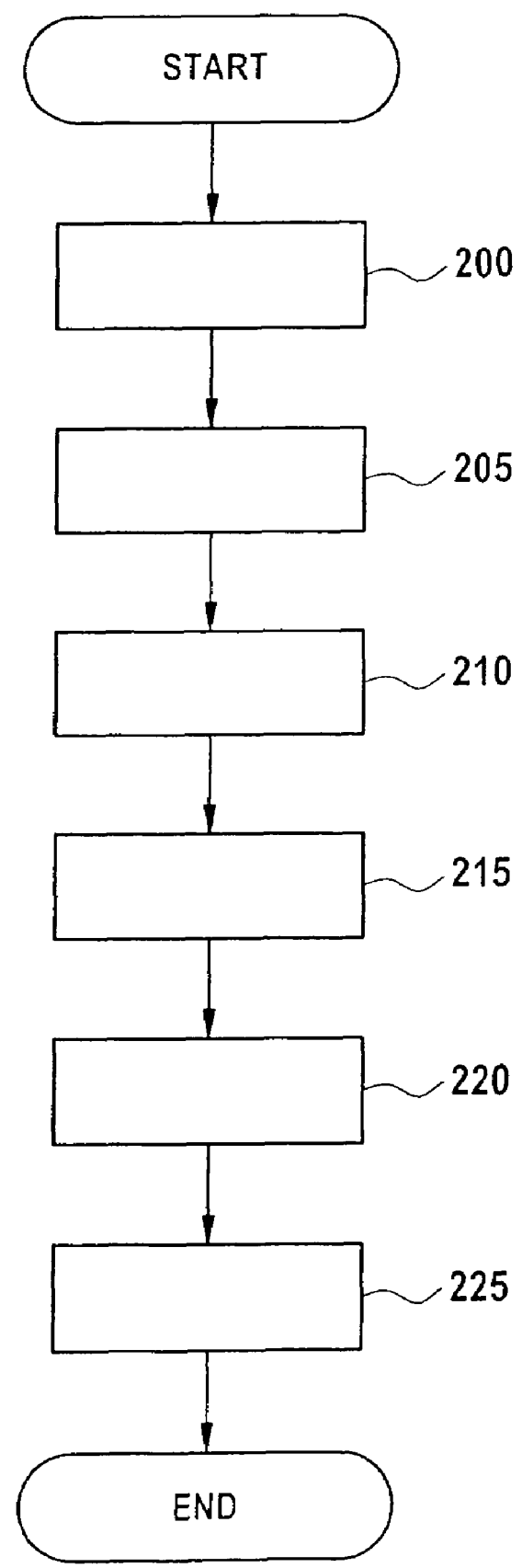
FIG. 4 shows a flow chart for an exemplary sequence of a method for ascertaining the characteristic quantity for the suction performance of the cylinder.

A characteristic value for the cylinder-individual suction performance may be obtained from values for the instantaneous intake manifold pressure averaged over the first predefined crank angle interval and the intake manifold pressure in the previous synchronous computation grid as well as from an air mass flow rate into intake manifold 25 averaged over the second predefined crank angle interval, i.e., as a function of the air mass flow rate into intake manifold 25 of the internal combustion engine in the instantaneous intake phase and a change in the intake manifold pressure in the last two successive intake phases for the cylinder in question. The method according to the present invention is illustrated in FIG. 4 in the form of a flow chart as an example. After the start of the program, engine controller 35 detects the sample values of intake manifold pressure sensor 55 during the first predefined crank angle interval at program point 200 and detects the sample values of air mass flow rate meter 80 during the second predefined crank angle interval. In the case of ascertaining air mass flow rate mszu from the secondary load signal, engine controller 35 ascertains the corresponding computation values for air mass flow rate mszu at program point 200 in the second predefined crank angle interval by the method described here. The program then branches off to a program point 205.

At program point 205, engine controller 35 forms an average of the sampled values for the intake manifold pressure or the random samples obtained for the intake manifold pressure in the first predefined crank angle interval. This average is represented by quantity ps(n). Furthermore, engine controller 35 ascertains at program point 205 the average of the values determined or calculated in the second predefined crank angle interval for air mass flow rate mszu or the random samples formed in this second predefined crank angle interval for air mass flow rate mszu, so that with the help of equation (3) and with the help of the average for engine speed nmot in the second predefined crank angle interval and applied constant KUMSRL, quantity rlzu(n) is obtained for the filling supplied to intake manifold 25. Furthermore, engine controller 35 also ascertains at program point 205 value ps(n−1) from the previous computation grid as an average of the intake manifold pressures formed in the previous intake phase of the cylinder in question in the first predefined crank angle interval there in the manner described here. The program then branches off to a program point 210.

At program point 210, engine controller 35 calculates filling rlab(n) according to equation (5) as the instantaneous intake by the cylinder in question as the average in the manner described above. The first characteristic value for the suction performance of the cylinder in question is then available, so it is possible to depart from the program. However, the program optionally branches off to a program point 215 after program point 210.

At program point 215 according to equation (6), factor fupsrl(n) for the conversion of pressure into filling is again calculated in the form of an average and represents the second characteristic quantity for the suction performance of the cylinder in question. It is then possible to depart from the program. Alternatively, however, it is also possible to branch off from program point 215 to program point 220. At program point 220, factor$_{fupsrl}$ is calculated according to equation (7) as an average and as the third characteristic quantity for the suction performance of the cylinder in question. The program is then terminated.

Figure 3:
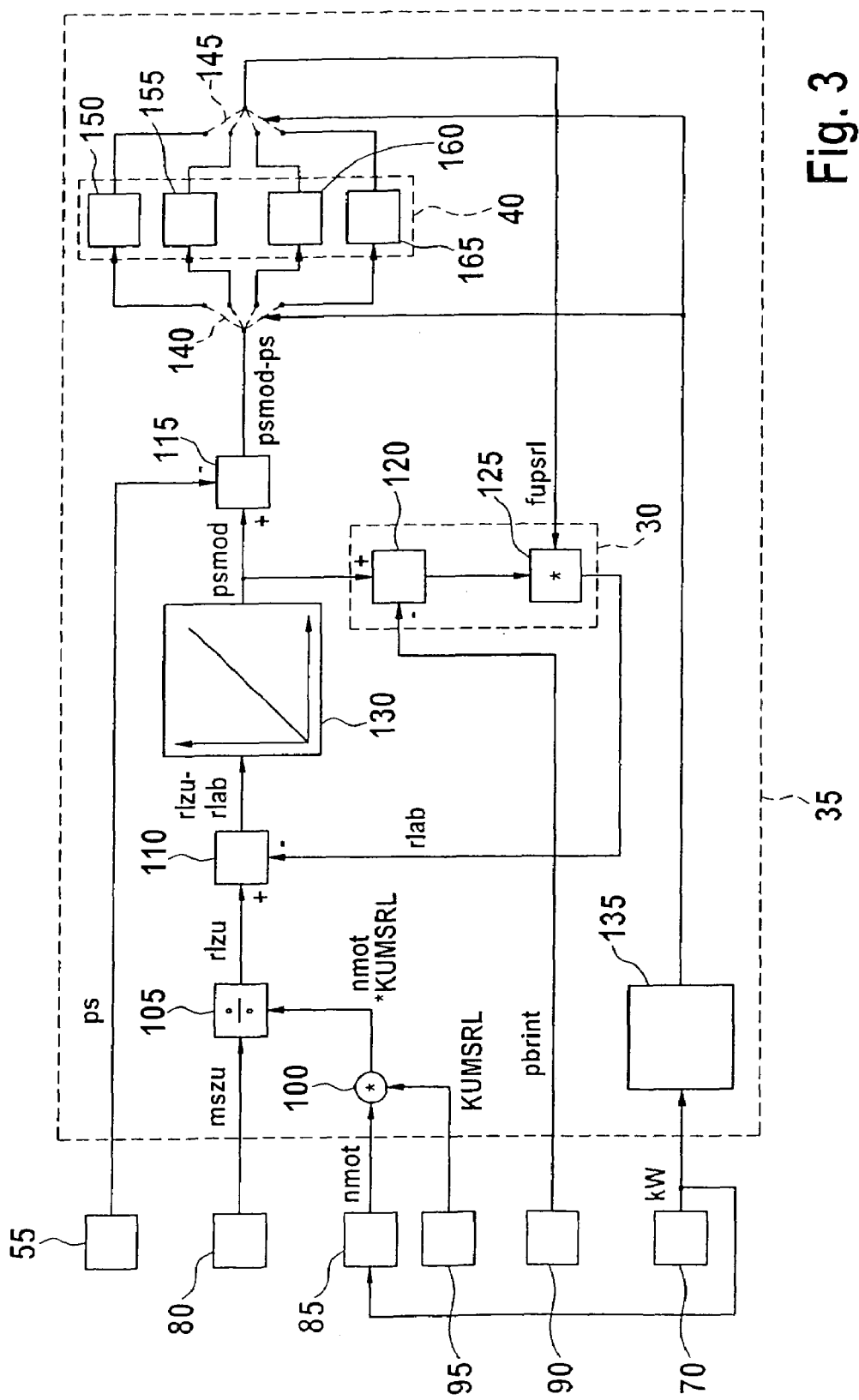
FIG. 3 shows a function diagram to illustrate a device and a method for ascertaining a characteristic quantity for the suction performance of a cylinder of the internal combustion engine.

As an alternative to calculating the particular characteristic quantity for the suction performance of the cylinder in question with the help of equations (5) through (7), the characteristic quantity for the cylinder-individual suction performance may also be learned with the help of an adaptation. In this case, the intake manifold and gas exchange model depicted in FIG. 3 is implemented in the hardware and/or software of the engine controller and is calculated in a synchronous computation grid with each intake operation of a cylinder. The intake manifold model and the gas exchange model correspond exactly to equations (5) through (7), the only difference being the fact that in adaptation the characteristic quantity for the cylinder-individual suction performance is adapted by matching a modeled intake manifold pressure with the measured intake manifold pressure.

In FIG. 3, the same reference numerals denote the same elements as in FIG. 1. For the exemplary embodiment according to FIG. 3, it is assumed that air mass flow rate mszu is detected by air mass flow meter 80. Instantaneous crank angle values KW detected by crank angle sensor 70 are conveyed to a differentiating unit 85, which ascertains the gradient over time of the crank angle detected by crank angle sensor 70 and conveys this information as engine speed nmot to a first multiplication unit 100, to which factor KUMSRL is also conveyed from a factor value memory 95. Product nmot*KUMSRL which is applied to the output of first multiplication unit 100 is conveyed as a divisor to a division unit 105, to which measured air mass flow rate mszu is also conveyed as the dividend by air mass flow meter 80. Quotient rlzu=mszu/(nmot*KUMSRL) is thus applied at the output of division unit 105 according to equation (3).

In a first subtraction unit 110, filling rlab formed by a gas exchange model 30 and flowing into the cylinder in question is subtracted from this quotient. Difference rlzu−rlab is applied to the output of first subtraction unit 110. This difference is conveyed as the input quantity to a first integrator 130 representing the intake manifold model. Thus, a modeled value for intake manifold pressure psmod is obtained at the output of first integrator 130. Intake manifold pressure ps measured by intake manifold pressure sensor 55 is then subtracted from modeled value psmod of the intake manifold pressure in a second subtraction unit 115. Resulting difference psmod−ps may be conveyed via a first controlled switch 140 to a second integrator 150, a third integrator 155, a fourth integrator 160, or a fifth integrator 165, depending on the switch position. Second integrator 150 is assigned to first cylinder 5, third integrator 155 is assigned to second cylinder 10, fourth integrator 160 is assigned to third cylinder 15, and fifth integrator 165 is assigned to fourth cylinder 20.

The output signal of crank angle sensor 70 is additionally conveyed to an analyzer unit 135 of engine controller 35, which in the intake phase of first cylinder 5 triggers first controlled switch 140 to connect the output of first subtraction unit 110 to second integrator 150, during the intake phase of second cylinder 10 for connecting the output of first subtraction unit 110 to third integrator 155, during the intake phase of third cylinder 15 for connecting the output of second subtraction unit 115 to fourth integrator 160, and during the intake phase of fourth cylinder 20 for connecting the output of second subtraction 115 to fifth integrator 165. Via a second controlled switch 160, which is switched by analyzer unit 135 in synchronization with first controlled switch 140, the outputs of integrators 150, 155, 160, 165 are optionally connectable to a second multiplication unit 125 of gas exchange model 30.

In doing so, the output of second integrator 150 is connected to second multiplication unit 125 during the intake phase of first cylinder 5, the output of third integrator 155 is connected to second multiplication unit 125 during the intake phase of second cylinder 10, the output of fourth integrator 160 is connected to second multiplication unit 125 during the intake phase of third cylinder 15, and the output of fifth integrator 165 is connected to second multiplication unit 125 in the intake phase of fourth cylinder 20. The output of integrators 150, 155, 160, 165 represents factor fupsrl for the conversion of pressure into filling.

It is adapted by integrators 150, 155, 160, 165 in the sense of minimizing difference psmod−ps. In a third subtraction unit 120, partial pressure pbrint of the residual gas from a residual gas value memory 90 is subtracted from modeled intake manifold pressure psmod at the output of first integrator 130. Resulting difference psmod−pbrint at the output of third subtraction unit 120 is conveyed to second multiplication unit 125, where it is multiplied times factor fupsrl for the conversion of pressure into filling, so that filling rlab which is the intake into the cylinder in question is obtained at the output of second multiplication unit 125 and is conveyed as described to first subtraction unit 110. Third subtraction unit 120 and second multiplication unit 125 form gas exchange model 30. Integrators 150, 155, 160, 165 form a determination unit 40 for ascertaining a characteristic value for the suction performance of the individual cylinders, i.e., a cylinder-individual suction performance in the form of factor fupsrl for the conversion of pressure into filling.

With the adaptation of factor fupsrl for the conversion of pressure into filling, value rlab for the intake filling in the cylinder in question is adapted as the first characteristic value for the suction performance. Residual gas value memory 90 and factor value memory 95 as well as differentiating unit 85 are situated outside of engine controller 35 according to FIG.

3 and may be implemented optionally and independently of one another in engine controller 35 as well.

In addition, it is optionally provided that the resulting value for the first, second, or third characteristic quantity used for the suction performance of a cylinder is compared with a setpoint value and, depending on the result of a comparison, the suction function of the cylinder in question is diagnosed. This may take place at program point 225 following program point 220 according to FIG. 4, where a program point 225 is shown with dashed lines. The setpoint value may be applied on a test bench, for example. If the resulting value for the characteristic quantity used at program point 225 matches the setpoint value within a predefined tolerance range, e.g., likewise applied on a test bench, then error-free functioning of the suction of the cylinder in question is diagnosed; otherwise an error in the suction of the cylinder in question is diagnosed and a visual and/or acoustic warning, if necessary emergency operation of the internal combustion engine or as a last consequence shutdown of the internal combustion engine, is initiated.

According to another optional specific embodiment of the present invention, a cylinder-individual filling regulation may be implemented with the help of the characteristic quantity for the suction performance of the cylinder in question, in which the characteristic quantity for the suction performance of the cylinder in question ascertained and used in the manner described here being corrected to a predefined setpoint value.

The setpoint value in this case may be ascertained as a function of a driver's intent or a command from an external control system such as a traction control system, an antilock brake system, a vehicle dynamics control system, a cruise control or the like or applied as a fixed value on a test bench, for example. The cylinder-individual filling regulation may then be accomplished, for example, by individual triggering of at least one gas exchange valve of the cylinder in question, e.g., one or more intake valves and one or more exhaust valves of the cylinder in question. This is possible in particular in the case of a fully variable valve control in which cylinder-individual fluctuations in the suction performance may be detected and regulated out in this way or regulated intentionally on the basis of cylinder-individual setpoint fillings. A corresponding regulating step for the instantaneous intake phase of the cylinder in question is performed at program point 225 according to FIG. 4. The program according to FIG. 4 is run through for each intake phase of the cylinder in question at that time. The program is terminated after a program point 225.

According to another optional specific embodiment, it is provided that the ascertained and used characteristic quantity for the suction performance is ascertained for several cylinders, and values for the characteristic quantity for the suction performance resulting for several cylinders are compared with one another and, depending on the result of this comparison, the function of the suction of the cylinders is diagnosed. This allows for a diagnosis of unwanted cylinder-individual differences between the suction performances of individual cylinders. A typical application is the diagnosis of valve drives for cylinder shutdown.

Cylinders erroneously shut down or erroneously active are detected immediately. Furthermore, an unambiguous cylinder assignment may be made here on the basis of the first and second crank angle intervals selected as described. Additional applications are also conceivable in the case of valve drives having a lift changeover element. The different suction performances in the case of using different valve lift diagrams with different cylinders may be detected and compared with their setpoint values for diagnostic purposes. However, valve control systems having phase control, where cylinder-individual differences may occur due to the design, may also be diagnosed in this way. In particular, differences in the suction performance of different cylinders may be diagnosed in the manner described here in the case of electromagnetic or electrohydraulic fully variable valve controls.

In the case of the comparison of the characteristic values for the suction performances of several cylinders as described here, differences in the suction performance of individual cylinders may also be eliminated by regulating the characteristic values for the suction performances of the individual cylinders to a common setpoint value to thereby achieve an equalization of these cylinders from the standpoint of the characteristic quantity for the suction performance.

The diagnosis of an error in the cylinder-individual suction performance of a cylinder may be due to the fact that the piston rings are no longer tight enough, for example, so the filling of the cylinder in question is reduced at low loads and engine speeds due to the fact that gas from the crankcase negatively affects the fresh air influx through intake manifold 25. In this case, through cylinder-individual diagnosis of the suction performance, it is possible to implement a compression diagnosis in which the piston rings are checked for adequate tightness.

The diagnoses described may be performed at the end of the assembly line after manufacturing the internal combustion engine and/or the vehicle or in the shop or during ongoing operation of the internal combustion engine. At the end of the assembly line, all possible variations of valve lift diagrams may be checked in the manner described here for their effects on the filling of the individual cylinders for diagnostic purposes.

Figure 6:
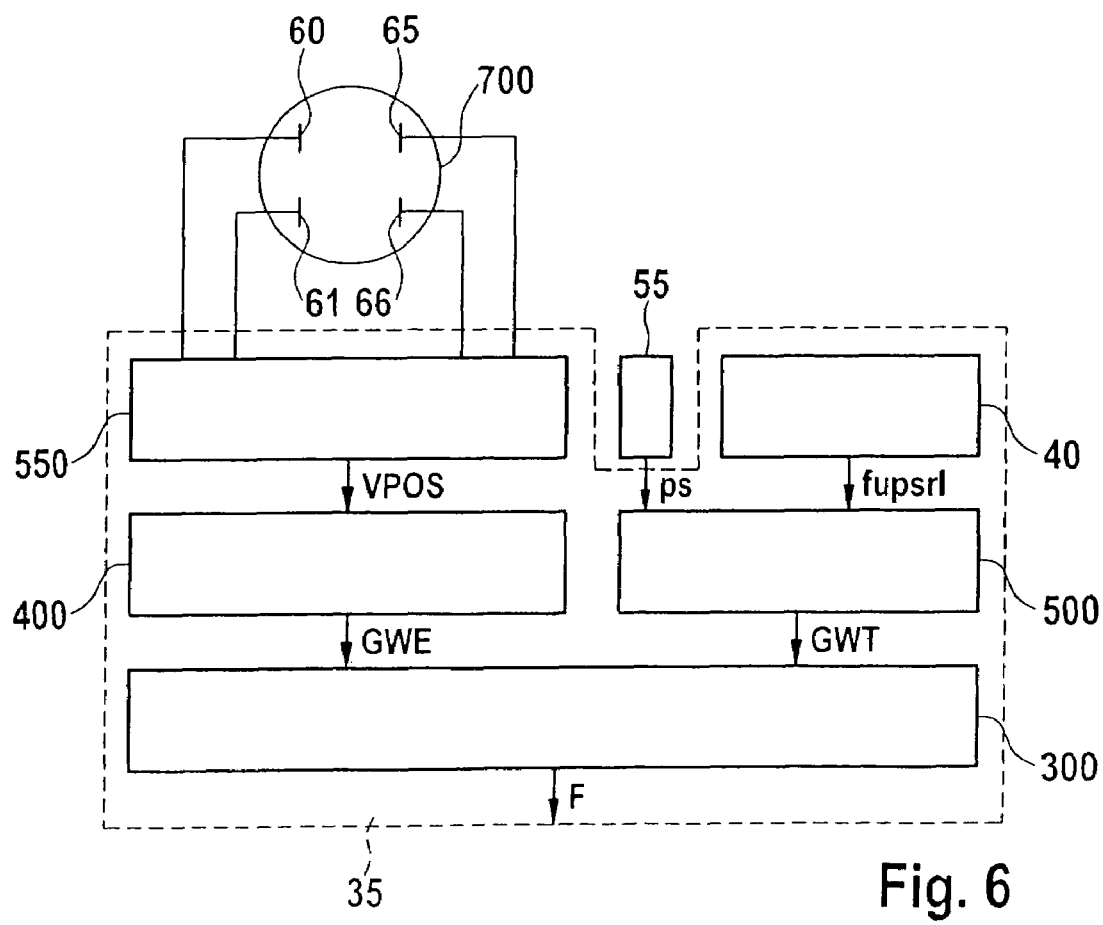
FIG. 6 shows a function diagram to illustrate the method and device according to the present invention.

In FIG. 1, four cylinders 5, 10, 15, 20 each include an intake valve 60 and an exhaust valve 65, as described for first cylinder 5 as an example. However, the method and device described here for ascertaining the characteristic quantity for the suction performance of a cylinder of the internal combustion engine does not depend on the number of intake valves and the number of exhaust valves of the cylinder in question. The only prerequisite for the described operating mode for ascertaining the characteristic quantity for the suction performance of a cylinder of the internal combustion engine is the existence of at least one intake valve and at least one exhaust valve on the corresponding cylinder. The example of a cylinder having two intake valves and two exhaust valves will be considered below. This is illustrated in FIG. 6 and labeled with reference numeral 700. Cylinder 700 thus includes a first intake valve 60 and a second intake valve 61 as well as a first exhaust valve 65 and a second exhaust valve 66. Valves 60, 61, 65, 66 of cylinder 700 are variably adjustable with regard to their opening and closing times by a valve control 550.

Valve control 550 may be designed as a fully variable valve control, for example. To this end, valve control 550 may be designed as an electrohydraulic valve control EHVC or as an electromagnetic valve control EMVC, so that the opening and closing times of valves 60, 61, 65, 66 may be infinitely adjustable and thus fully variable. Valve control 550 may be designed as a component of engine controller 35, as shown in FIG. 6.

FIG. 6 shows only the components of engine controller 35 that are needed to describe the method and device according to the present invention with regard to detection of at least one intake valve 60, 61 or exhaust valve 65, 66 for the presence of an erroneous valve position. This includes determination unit 40 described above for ascertaining the characteristic value for the suction performance of the individual cylinders, e.g., in the form of factor fupsrl for the conversion of pressure into filling. This factor is forwarded to a first determination unit 500 which ascertains an actual value GWT characteristic for a gas exchange of cylinder 700 and forwards this information to a comparator unit 300.

In addition, intake manifold pressure ps thereby ascertained is conveyed to first determination unit 500 by intake manifold pressure sensor 55. Comparator unit 300 and first determination unit 500 are also part of engine controller 35 according to FIG. 6. The same is also true of a second determination unit 400 which receives from valve control unit 550 the instantaneous set valve positions of intake valves 60, 61 and exhaust valves 65, 66, labeled as VPOS in FIG. 6. Second determination unit 400 ascertains a value GWE, which is characteristic for the gas exchange of cylinder 700, from the valve positions VPOS supplied by valve control unit 550; this value GWE is expected at the moment for an error-free state of set valve positions HPOS of intake valves 60, 61 and exhaust valves 65, 66 of cylinder 700. Second determination unit 400 also sends this characteristic value for expected gas exchange GWE to comparator unit 300.

Comparator unit 300 compares the characteristic value for expected gas exchange GWE with the characteristic value for actual gas exchange GWT and delivers a signal F at its output as a function of the result of the comparison; this signal, when set, indicates an error in the position of at least one of the intake and exhaust valves 60, 61, 65, 66 and indicates in the reset state no error in the positions of the intake and exhaust valves 60, 61, 65, 66. Thus comparator unit 300 at the same time constitutes an error detection unit for the position of intake and exhaust valves 60, 61, 65, 66 of cylinder 700. The operating mode of the method according to the present invention is explained below on the basis of the flow chart according to FIG. 7 as an example. The program is processed by the engine controller and the components illustrated in FIG. 6. After the start of the diagnostic program, a check is performed in engine controller 35 at a program point 1000 in a manner known to those skilled in the art and will therefore not be described further here to ascertain whether the operating state is that of overrun fuel cutoff. The overrun fuel cutoff operating state may be detected by engine controller 35, for example, on the basis of the accelerator pedal having been released while the clutch is engaged.

Figure 5:
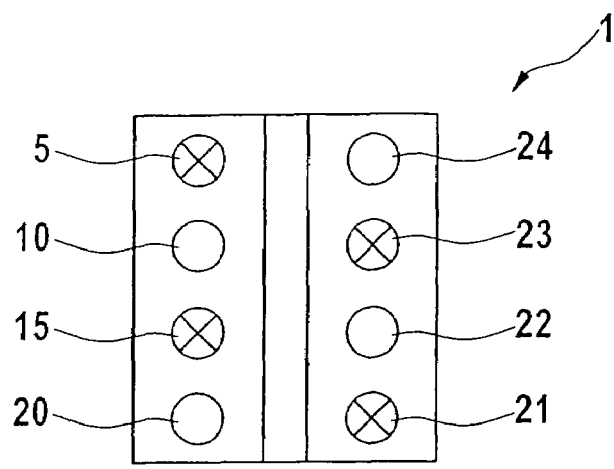
FIG. 5 shows a schematic diagram of an internal combustion engine in which the number of cylinders is twice that of the internal combustion engine according to FIG. 1 and which operates in half-engine operation.

If the overrun fuel cutoff operating state is detected by engine controller 35, then the program branches off to a program point 1200, otherwise to a program point 1100. At program point 1100, the engine controller checks, again in a manner known to those skilled in the art, on whether the operating state of half-engine operation is occurring, in which only half of the cylinders of internal combustion engine 1 are activated but the other half of the cylinders are shut down. As an example in this regard, FIG. 5 shows the internal combustion engine of FIG. 1 having four additional cylinders. Thus, in addition to four cylinders 5, 10, 15, 20, internal combustion engine 1 according to FIG. 5 has a fifth cylinder 21, a sixth cylinder 22, a seventh cylinder 23, and an eighth cylinder 24.

Figure 8:
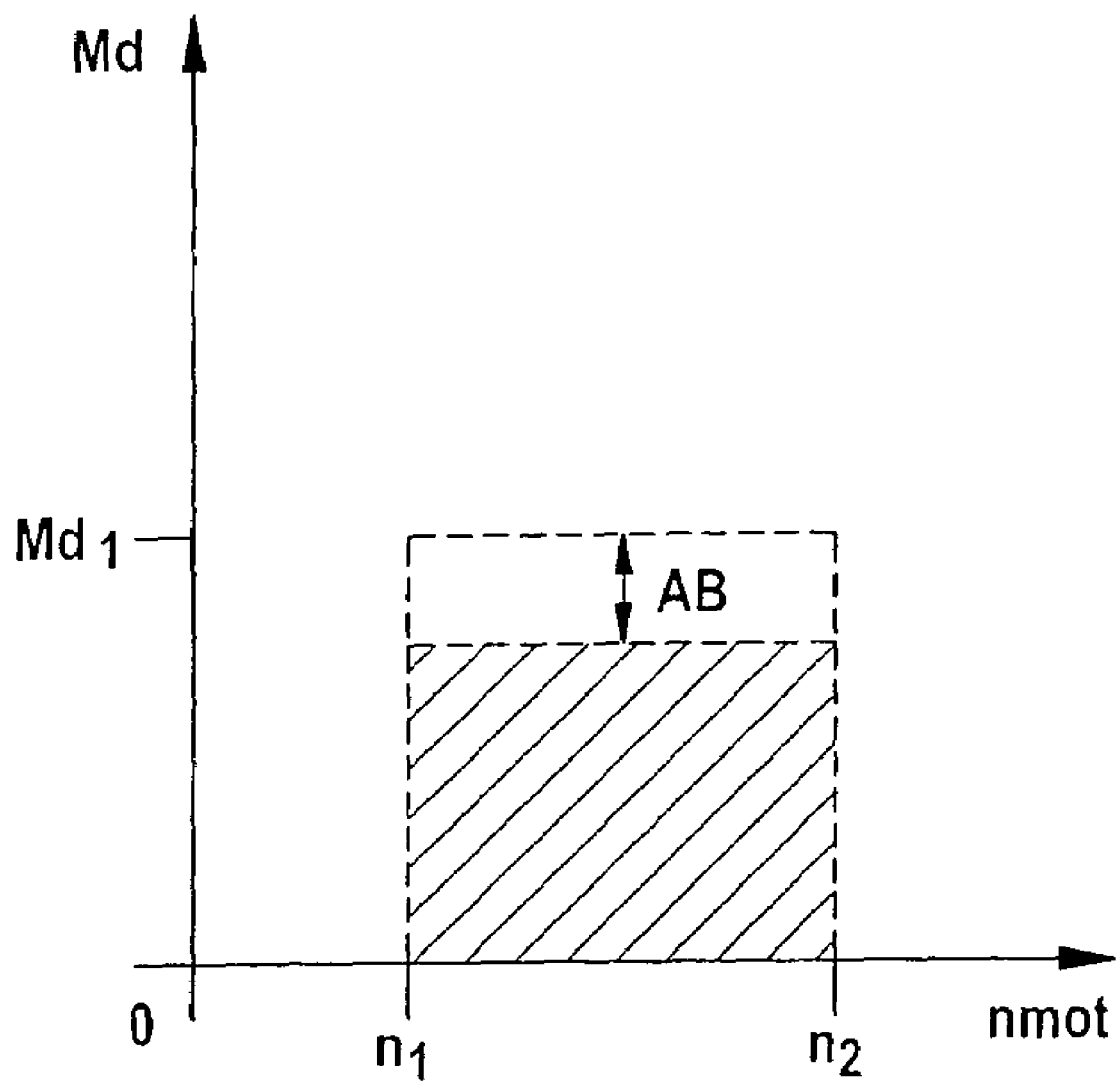
FIG. 8 shows an operating range of the internal combustion engine for performing the diagnosis according to the present invention.

In the diagram according to FIG. 5, first cylinder 5, third cylinder 15, fifth cylinder 21, and seventh cylinder 23 are shut down, while the other cylinders 10, 20, 22, 24 are activated. The operating state of half-engine operation is detected by the engine controller in a manner known to those skilled in the art if, as depicted in FIG. 8, engine speed nmot is between a first engine speed $n_1$ and a second engine speed $n_2$ where $n_2 > n_1$ and if at the same time torque Md delivered by the engine assumes a value between 0 and an upper threshold value Md1 which is equal to half the maximum adjustable engine torque Md. However, the diagnosis described below results in a perceptible drop in torque during normal driving operation in half-engine operation with engine torques in the range of upper limiting value Md1, so that to avoid this, the diagnosis may optionally be released only for the case when the engine torque is lower by an applicable amount AB smaller than upper limiting value Md1. This amount is applied in such a way that for performing the diagnosis described below during ongoing operation of the internal combustion engine the drop in torque associated with the diagnosis remains as unnoticed as possible by the driver of a vehicle powered by this internal combustion engine.

Thus, if at program point 1100 engine controller 35 detects the fact that the internal combustion engine is in half-engine operation, which may have a torque lower than upper limiting value Md1 by the applicable amount AB, then the program branches off to program point 1200; otherwise the program is terminated and no diagnosis is performed. It should be pointed out that the diagnosis described below is of course also possible in full-engine operation in which at first all the cylinders are activated, as is also the case in an overrun fuel cutoff in which the fuel supply to the individual cylinders is interrupted but the valves are not shut down. In full-engine operation, however, a perceptible loss of torque may be expected when performing the diagnosis described below.

At program point 1200 for the case of overrun fuel cutoff, cylinder 700 that is to be diagnosed is selected as an example and shut down, i.e., valve control 550 controls all valves 60, 61, 65, 66 in such a way that they are permanently closed completely. In the case of half-engine operation detected previously, engine controller 35 selects at program point 1200 one of the cylinders already shut down as cylinder 700 of FIG. 6 for diagnosis, its valves having already been triggered permanently into the completely closed position. The program then branches off to a program point 1300.

At program point 1300, engine controller 35 checks on whether one or all of exhaust valves 65, 66 of cylinder 700 are to be diagnosed, e.g., checking based on a diagnosis command by a diagnosis control device (not shown in FIG. 6). If this is the case, then the program branches off to a program point 1400; otherwise, i.e., when one or all of intake valves 60, 61 of cylinder 700 are to be diagnosed, the program branches off to a program point 1500. It does not matter for the diagnosis of the exhaust valve(s) or for the diagnosis of the intake valve(s) how many there are in cylinder 700.

At program point 1400 valve control 550 causes one or all of intake valves 60, 61 to open. The program then branches off to a program point 1500.

At program point 1500, valve control 550 causes one or all of exhaust valves 65, 66 to be opened.

The program then branches off to program point 1600.

At program point 1600, second determination unit 400 ascertains the expected characteristic value for the gas exchange. The expected characteristic value for the gas exchange is zero when no gas exchange is expected and is one when a gas exchange is expected. An error-free state of the set valve positions of all intake and exhaust valves 60, 61, 65, 66 of cylinder 700 is assumed for ascertaining the characteristic value for expected gas exchange GWE. Thus, in the present case with an error-free state of the set valve positions, no gas exchange is expected at the moment because with an error-free valve position, all exhaust valves 65, 66 would have to be closed at program point 1400 and all intake valves 60, 61 would have to be closed at program point 1500.

The value zero is therefore obtained as characteristic value GWE at program point 1600. If all intake valves or all exhaust valves are permanently closed, as in the case of program points 1400 and 1500 with an error-free valve position, then there is no gas exchange, i.e., no gas exchange between intake manifold 25 and exhaust tract 75 by way of cylinder 700 is possible. The expected value for gas exchange GWE for cylinder 700 is thus zero. In addition, at program point 1600 value GWT, which is actually characteristic for the gas exchange of cylinder 700, is ascertained by first determination unit 500 as a function of supplied intake manifold pressure ps and supplied suction performance fupsrl in a manner to be described in greater detail below. For the case when one or both of exhaust valves 65, 66 is/are erroneously opened or is/are erroneously opening at program point 1400, the result is a gas exchange between intake manifold 25 and exhaust tract 75, so that actual value GWT characteristic for the gas exchange of cylinder 700 is equal to one.

The situation is similar when one or both of intake valves 60, 61 is/are erroneously opened or is/are erroneously opening at program point 1500. However, if both exhaust valves 65, 66 are error-free at program point 1400 and are closing permanently and if both intake valves 60, 61 are error-free at program point 1500 and are closing permanently, this yields the value zero as actual value GWT characteristic for the gas exchange of cylinder 700. The program then branches off to a program point 1700.

At program point 1700, detection unit 300 checks on whether characteristic value GWE expected at the moment matches the actually ascertained characteristic value GWT. If this is the case, then a lack of errors is detected, signal F at the output of detection unit 300 is reset, and the program is terminated. Otherwise it branches off to a program point 1800.

At program point 1800, signal F is set at the output of detection unit 300 and an error in one of the exhaust valves is detected if program point 1800 has been reached via program point 1400, and an error in one of intake valves 60, 61 is detected if program point 1800 has been reached via program point 1500. Which of the intake and/or exhaust valves is defective cannot be determined here unless cylinder 700 includes only one exhaust valve in the case of the defective exhaust valve to be detected via program point 1400 or cylinder 700 includes only one intake valve in the case of the defective intake valve to be detected via program point 1500.

The program then branches off to a program point 1900.

At program point 1900, the diagnosis control selects a cylinder of internal combustion engine 1 to be diagnosed that is activated or is to be activated; in the following discussion, this cylinder will again be cylinder 700 according to FIG. 6 as an example which is activated for this purpose when it was previously shut down, i.e., valve control 550 controls all valves 60, 61, 65, 66 in such a way that they open and close in a known manner in the subsequent working cycles and allow a gas exchange because an activated cylinder draws air from the intake manifold through the intake valve(s) into the combustion chamber of the cylinder and expels exhaust gas from the combustion chamber of the cylinder into the exhaust tract via the exhaust valve(s), so that the value for the gas exchange is equal to one. The program then branches off to a program point 2000.

At program point 2000, engine controller 35 checks on whether instructions for diagnosing a certain exhaust valve are available from the diagnosis control. If this is the case, the program branches off to a program point 2200; otherwise, i.e., in the case when the diagnosis control specifies that a certain intake valve of cylinder 700 is to be diagnosed, the program branches off to a program point 2100.

In the case of the diagnosis of an activated cylinder, a certain defective exhaust valve or a certain defective intake valve may be identified so that a corresponding specification for diagnosing a certain exhaust valve is made by the diagnosis control via program point 2200 or for diagnosing a certain intake valve via program point 2100.

At program point 2200, valve control 550 prompts all exhaust valves that are different from the exhaust valve to be diagnosed to be closed for at least one double crankshaft revolution. For example, if first exhaust valve 65 is to be diagnosed, then valve control 550 prompts a corresponding closing of second exhaust valve 66.

At program point 2100, valve control 550 accordingly prompts all intake valves that are different from the intake valve to be diagnosed to be closed for at least one double crankshaft revolution. In the example according to FIG. 6, for the case when first intake valve 60 is to be diagnosed, second intake valve 61 is closed by valve control 550 accordingly.

Subsequently the program branches off from program point 2100 as well as from program point 2200 to a program point 2300.

At program point 2300, second determination unit 400 ascertains the characteristic value expected at the moment for gas exchange GWE under the assumption of an error-free valve position of all valves 60, 61, 65, 66. The characteristic value expected at the moment for gas exchange GWE is in this case equal to one because a gas exchange via the intake valve or exhaust valve that is to be diagnosed should be possible. At program point 2300 first determination unit 500 ascertains the actually ascertained value GWT characteristic for the gas exchange of cylinder 700 as a function of supplied intake manifold pressure ps and supplied suction performance fupsrl. If the exhaust valve to be diagnosed is then erroneously jammed closed or erroneously closes for at least the double crankshaft revolution in question or if the intake valve to be diagnosed is jammed closed or erroneously closes for at least the double crankshaft revolution in question, then the value zero is obtained for the actually ascertained characteristic value GWT for the double crankshaft revolution in question because then in the case of program point 2200, all exhaust valves are closed and in the case of program point 2100 all the intake valves are closed for the crank angle revolution in question. The program then branches off to a program point 2400.

At program point 2400, detection unit 300 checks on whether the value GWE expected at the moment matches the actually ascertained value GWT. If this is the case, then signal F at the output of detection unit 300 is reset and no error is detected and the program is terminated; otherwise the program branches off to a program point 2500.

At program point 2500, signal F at the output of detection unit 300 is set and thus the exhaust valve to be diagnosed is detected as closing erroneously in the case of program point 2200, and in the case of program point 2100 the intake valve to be diagnosed is detected as closing erroneously. The program is subsequently terminated.

For the case when cylinder 700 includes two or more exhaust valves in the case of the exhaust valve to be diagnosed and two or more intake valves in the case of the intake valve to be diagnosed, the method for identifying the defective valve may be performed in the manner described here. In the case when the exhaust valve is to be diagnosed, and cylinder 700 includes only this exhaust valve and no other exhaust valves, and in the case of the intake valve to be diagnosed and the cylinder includes only this intake valve and no other intake valves, program points 2100 and 2200 may be omitted and then program point 2000 presents only the instructions for diagnosing the single exhaust valve or the single intake valve on the part of the diagnosis control. In this case with an erroneously closed exhaust valve to be diagnosed and an erroneously closed intake valve to be diagnosed, the actually ascertained characteristic value for the gas exchange is already equal to zero for the duration of at least one double crankshaft revolution without requiring that any additional valves be closed. In the case of a single exhaust valve being present and to be diagnosed, multiple intake valves may readily be present in cylinder 700, and in the case of a single intake valve being present and to be diagnosed, multiple exhaust valves may also be present.

Figure 7:
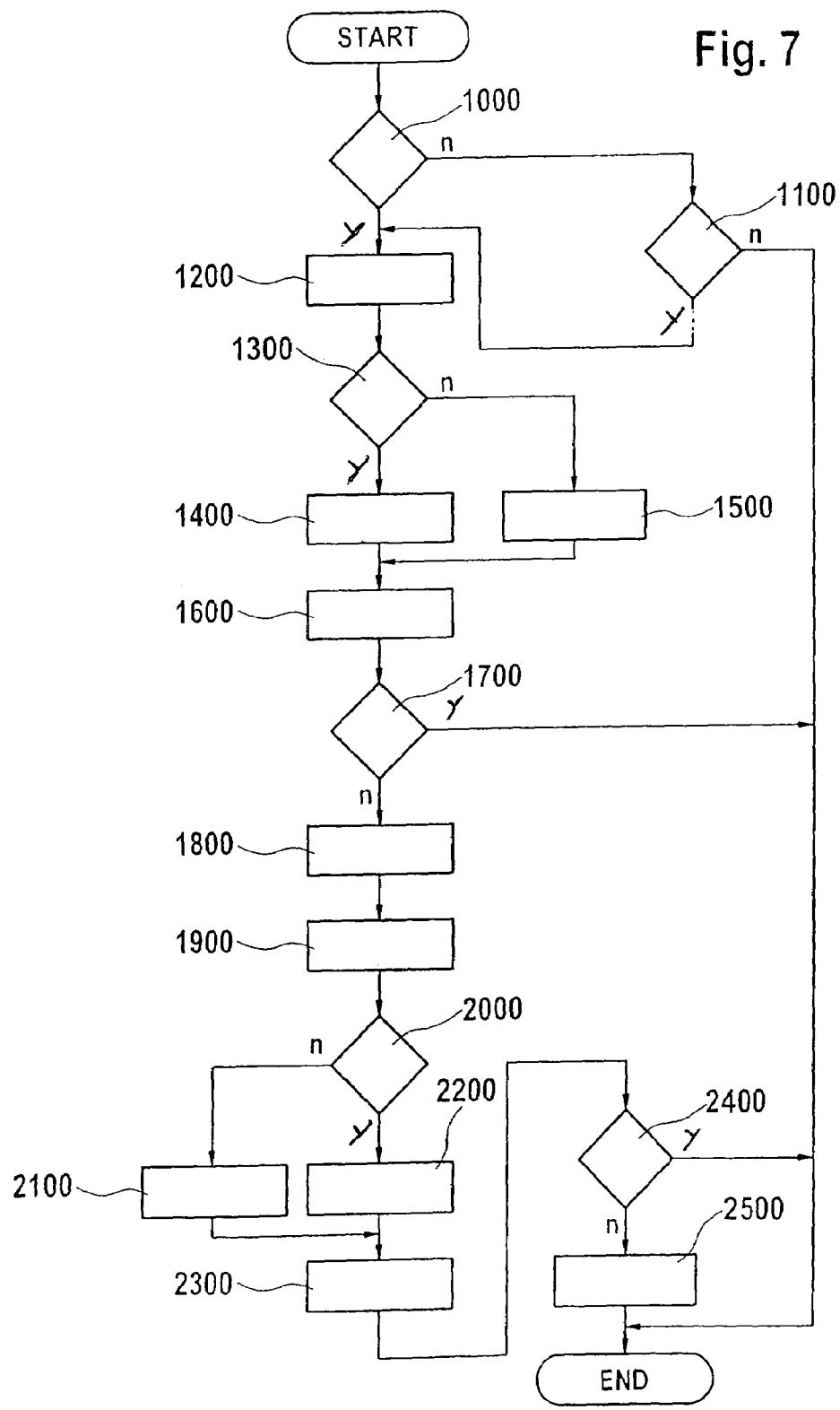
FIG. 7 shows a flow chart for an exemplary sequence of the method according to the present invention.

In general, the method and device according to the present invention as illustrated in FIGS. 6 and 7 are based on the following principle.

For detecting at least one intake valve or exhaust valve to determine the presence of an erroneous valve position, at least one intake valve or exhaust valve of the at least one cylinder different from at least one intake valve or exhaust valve to be detected is brought into a predefined position, which is selected in such a way that the gas exchange of the at least one cylinder in the case of an erroneous valve position of the at least one intake valve or exhaust valve to be detected differs significantly from the gas exchange of the at least cylinder for the case of an error-free valve position of the at least one intake valve or exhaust valve, that a characteristic value for the gas exchange of the at least one cylinder is ascertained, this value being expected at the moment for an error-free state of the set valve position of all intake and exhaust valves of the at least one cylinder, that the actual value characteristic for the gas exchange of the at least one cylinder is ascertained and, that in the case of a deviation of the actual value from the expected value, an error in the position of the at least one intake valve or exhaust valve to be detected is recognized. The method and device according to the present invention therefore supply correct diagnostic results with certainty for the case in which there are no defective valves in addition to the valve(s) to be diagnosed. Otherwise the result of the diagnosis is subject to the risk of error.

If no cylinder of the internal combustion engine is activated at program point 1900, then a cylinder to be diagnosed is activated, e.g., as a function of a specification by the diagnosis control. This may be the case, for example, in an overrun fuel cutoff in which all cylinders are additionally shut down, i.e., their valves are permanently closed.

Due to the fact that gas exchange values GWE, GWT may assume only a value of zero or one for the diagnosis described here, this ensures that in the case of a deviation, the latter is significant.

The diagnosis described on the basis of cylinder 700 as an example may be performed for all cylinders of internal combustion engine 1 in the manner described here.

It is described below how the actually ascertained value characteristic for gas exchange GWT is ascertained by analysis of the intake manifold pressure curve and/or by analysis of the suction performance of cylinder 700 to be diagnosed. In the case of an intake valve that is erroneously not opening for at least one double crankshaft revolution or an intake valve that, due to an error, opens only briefly or with such a small lift that no mentionable air mass flow passes by the intake valve, there is no suction of cylinder 700 for this crankshaft revolution, i.e., suction performance fupsrl is equal to zero. Without suction performance, no gas exchange is possible, so that in this case the fact that value GWT equals zero may be deduced from fupsrl equals zero in first determination unit 500. In the case of an erroneously opened intake valve, however, there is a suction performance fupsrl greater than zero so that suction performance fupsrl alone is not sufficient to deduce whether or not there is a gas exchange. If all exhaust valves of cylinder 700 are closed for at least the double crankshaft revolution in question with the intake valve opening erroneously, then as a result the exhaust gases generated during combustion enter intake manifold 25 instead of entering exhaust tract 75. As a result, the intake manifold pressure curve has a peak originating from this backthrust of exhaust gas into the intake manifold. This peak in the intake manifold pressure curve may be detected by first determination unit 500, e.g., on the basis of a threshold value comparison or by analysis of the gradient of the intake manifold pressure curve. If the intake manifold pressure is above a predefined suitably applied threshold value in the exhaust cycle of cylinder 700 and/or if the gradient of the curve of the intake manifold pressure over time in the exhaust cycle is above a predefined suitably applied threshold value, then the absence of a gas exchange is recognized despite the fact that there is a suction performance of cylinder 700. Value GWT is then set to zero.

If all intake valves are permanently closed or if they are closed for at least one double crankshaft revolution, then no suction performance of cylinder 700 and thus no gas exchange are ascertained by first determination unit 500 for this period of time. If all exhaust valves are permanently closed or are closed for one double crankshaft revolution or if they open only so briefly, in particular due to an error, or with such a small lift that no mentionable exhaust gas flow passes by the corresponding exhaust valve, then the lack of a gas exchange is recognized for this period of time regardless of the existence of a suction performance of the cylinder on the basis of the exhaust gases escaping into the intake manifold in the exhaust cycle via the error-free or erroneously opening intake valve(s) and the resulting pressure peak detected by first determination unit 500 and value GWT is set to zero. In all other cases in which there is a suction performance of cylinder 700 and the aforementioned pressure peaks do not occur in the exhaust cycle, a gas exchange is detected by first determination unit 500 and GWT is set to one.

The diagnosis described here may also be performed simultaneously for multiple cylinders of internal combustion engine 1.

What is claimed is:

1. A method for operating an internal combustion engine having at least one cylinder, the at least one cylinder including at least one intake valve and at least one exhaust valve, the method comprising:

diagnosing a gas exchange of the at least one cylinder, for detecting at least one intake valve or exhaust valve for an existence of an erroneous valve position;

bringing at least one intake valve or exhaust valve of the at least one cylinder which is different from at least one intake valve or exhaust valve to be detected into a predefined position, which is selected so that the gas exchange of the at least one cylinder for an erroneous valve position of the at least one intake valve or exhaust valve to be detected differs significantly from the gas exchange of the at least one cylinder for an error-free valve position of the at least one intake valve or exhaust valve to be detected;

determining a value characteristic for a gas exchange of the at least one cylinder, the value being expected at a moment for an error-free state of set valve positions of the at least one intake valve and the at least one exhaust valve of the at least one cylinder;

determining an actual value characteristic for the gas exchange of the at least one cylinder; and recognizing an error in a position of the at least one intake valve or exhaust valve to be detected as a function of a deviation of the actual value from the expected value.

2. The method of claim 1, wherein the error in the position of the at least one intake valve or exhaust valve to be detected is recognized when a determined deviation is significant.

3. The method of claim 1, wherein the characteristic value for the gas exchange is determined by analyzing a pressure curve in at least one of an intake manifold of the internal combustion engine and a suction performance of the at least one cylinder of the internal combustion engine.

4. The method of claim 1, wherein for detecting an erroneously opened or erroneously opening intake valve of a shutdown cylinder, all of whose intake valves and exhaust valves are expected to be in a closed valve position, for a diagnosis of the gas exchange of the at least one cylinder, at least one exhaust valve is opened, wherein the characteristic value for the gas exchange of the at least one cylinder is determined with the at least one exhaust valve opened, and wherein an erroneously opened or erroneously opening intake valve is recognized when the determined characteristic value for the gas exchange of the at least one cylinder indicates a presence of a gas exchange.

5. The method of claim 1, wherein for detecting an erroneously opened or erroneously opening exhaust valve of a shutdown cylinder, all of whose intake valves and exhaust valves are expected to be in the closed valve position, for a diagnosis of the gas exchange of the at least one cylinder at least one intake valve is opened, wherein the characteristic value for the gas exchange of the at least one cylinder is determined with the at least one intake valve opened, and an erroneously opened or erroneously opening exhaust valve is recognized when the determined characteristic value for the gas exchange of the at least one cylinder indicates a presence of a gas exchange.

6. The method of claim 1, wherein for detecting an erroneously closed or erroneously closing exhaust valve of an activated cylinder for which a gas exchange is expected, for a diagnosis of the gas exchange of the at least one cylinder all of the exhaust valves of the at least one cylinder different from the erroneously closed or erroneously closing exhaust valve to be detected are closed, wherein, for this case, the characteristic value for the gas exchange of the at least one cylinder is determined and an erroneously closed or erroneously closing exhaust valve is recognized when the determined characteristic value for the gas exchange of the at least one cylinder indicates that there is no gas exchange.

7. The method of claim 1, wherein for detecting an erroneously closed or erroneously closing intake valve of an activated cylinder for which a gas exchange is expected, for a diagnosis of the gas exchange of the at least one cylinder, all of the intake valves of the at least one cylinder different from the erroneously closed or erroneously closing intake valve to be detected are closed, wherein, for this case, the characteristic value for the gas exchange of the at least one cylinder is determined and an erroneously closed or erroneously closing intake valve is recognized when the determined characteristic value for the gas exchange of the at least one cylinder indicates that there is no gas exchange.

8. The method of claim 1, wherein the detecting of an erroneous intake valve or exhaust valve is performed during an operating state of the overrun fuel cutoff during which, depending on a desired diagnosis, the at least one cylinder is activated or shut down.

9. The method of claim 1, wherein the detecting of an erroneous intake valve or exhaust valve is performed during an operating state of the half-engine operation during which half of the cylinders of the internal combustion engine are shut down and the other half of the cylinders of the internal combustion engine are activated.

10. A device for operating an internal combustion engine having at least one cylinder, the at least one cylinder including at least one intake valve and at least one exhaust valve, comprising:
- a diagnosing arrangement to diagnose a gas exchange of the at least one cylinder, for detecting at least one intake valve or exhaust valve for an existence of an erroneous valve position;
- a moving arrangement to move at least one intake valve or exhaust valve of the at least one cylinder different from the intake valve or exhaust valve to be detected into a predefined position, which is selected so that a gas exchange of the at least one cylinder for an erroneous valve position of the at least one intake valve or exhaust valve to be detected differs significantly from the gas exchange of the at least one cylinder for an error-free valve position of the at least one intake valve or exhaust valve to be detected;
- a first determining arrangement to determine a value characteristic for the gas exchange of the at least one cylinder, the characteristic value being expected at a moment for an error-free state of the set valve positions of the at least one intake valve and the at least one exhaust valve of the at least one cylinder;
- a second determining arrangement to determine an actual value characteristic for the gas exchange of the at least one cylinder; and
- a detecting arrangement to detect an error in the position of the at least one intake valve or exhaust valve to be detected as a function of a deviation in the actual value from the expected value.

* * * * *